United States Patent [19]

Cole, Jr.

[11] 3,847,571

[45] Nov. 12, 1974

[54] CYCLONE SEPARATOR WITH FOAM SUPPLY

[76] Inventor: Howard W. Cole, Jr., 12 Vale Dr., Mt. Lakes, N.J. 07046

[22] Filed: Sept. 11, 1973

[21] Appl. No.: 396,246

[52] U.S. Cl............................ 55/87, 55/92, 55/238, 55/261, 55/459, 261/79 A, 261/DIG. 26
[51] Int. Cl............................................. B01d 47/00
[58] Field of Search . 55/87, 261, 92, 432, 235–239, 55/459, 242; 261/79 A

[56] References Cited
UNITED STATES PATENTS

| | | | |
|---|---|---|---|
| 968,456 | 8/1910 | Edwards | 261/79 A |
| 1,130,849 | 3/1915 | Seymour, Jr. | 55/238 |
| 1,355,617 | 10/1920 | Niemeyer | 55/432 |
| 1,792,590 | 2/1931 | Kirk | 55/237 |
| 3,243,043 | 3/1966 | Thompson et al. | 55/432 |
| 3,667,687 | 6/1972 | Rivking et al. | 261/DIG. 26 |
| 3,675,396 | 7/1972 | Hawryluk et al. | 55/235 |

*Primary Examiner*—Bernard Nozick
*Attorney, Agent, or Firm*—Sandoe, Hopgood & Calimafde

[57] ABSTRACT

The cyclone separator of this invention has nozzles that direct foam into the gas streams flowing into the separator. The foam traps the particulate matter in the gas stream and coats the walls of the separator with a slurry which travels down the wall of the separator chamber to an opening at the bottom of the chamber. The slurry accumulates across this opening and there is a chamber bottom, preferably hinged, that automatically opens to dump the slurry each time that the accumulation reaches sufficient weight to open the hinged bottom.

12 Claims, 2 Drawing Figures

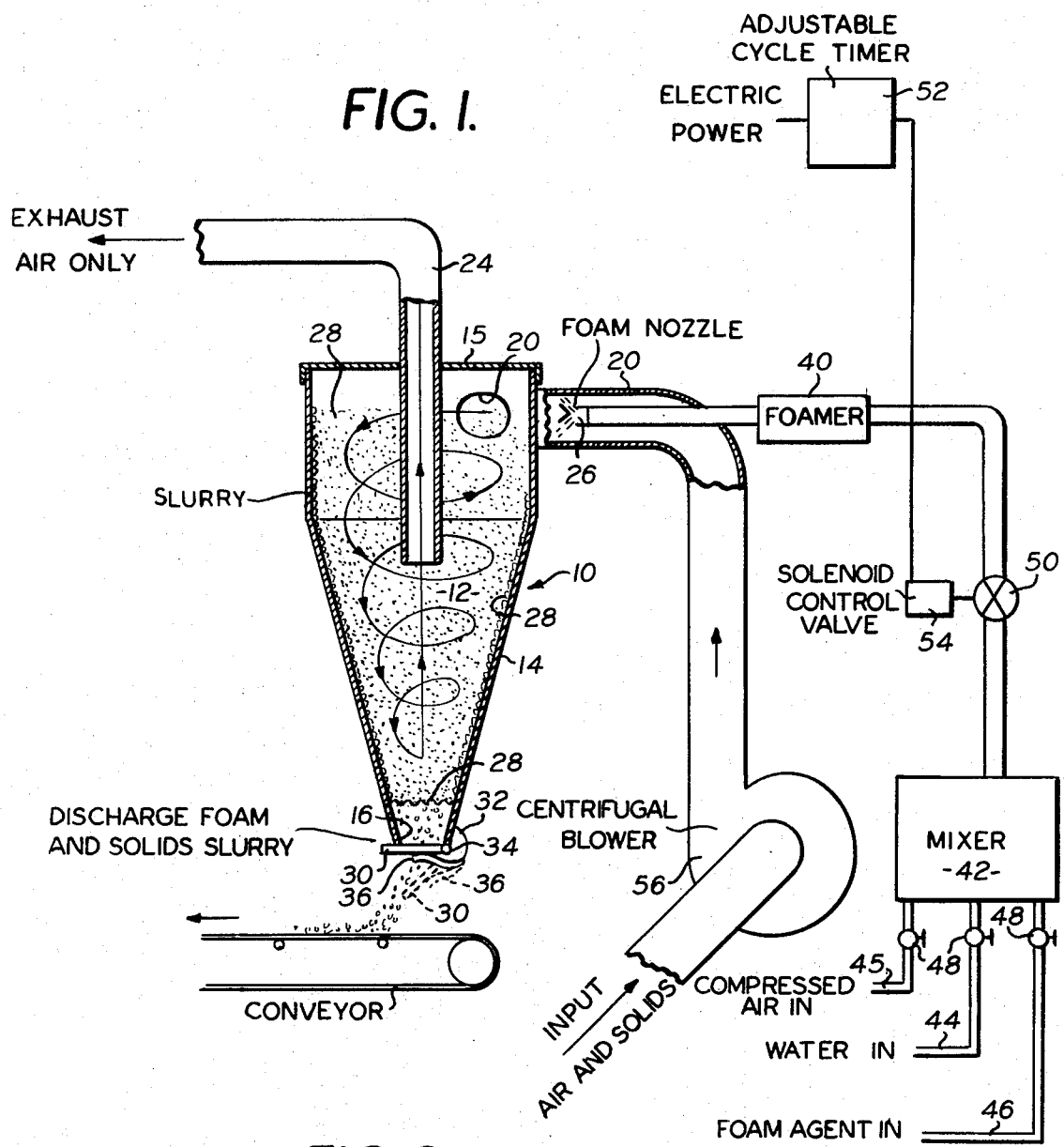
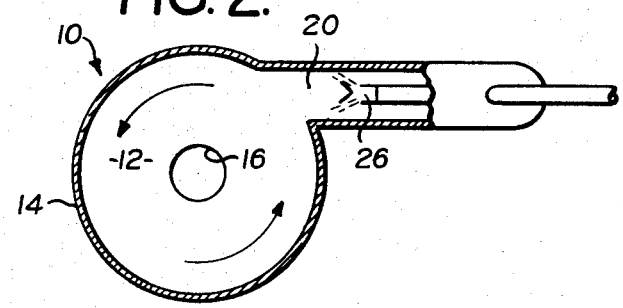

CYCLONE SEPARATOR WITH FOAM SUPPLY

BACKGROUND AND SUMMARY OF THE INVENTION

Cyclone separators are well-known apparatus for removing particulate matter from gas streams. The conventional cyclone separator has a frusto-conical chamber with the large diameter part of the chamber at the top. A gas outlet pipe is located with its inlet end extending into the separator chamber and in axial alignment with the axis of the chamber, but of substantially smaller cross section than the large diameter end of the chamber. One or more gas streams are discharged tangentially around the wall of the separation chamber in the upper end thereof, and with the direction of the tangential discharge having a slight downward component so that the discharging streams of gas set up the cyclonic circulation in the separation chamber.

As the gas streams whirl downwardly into the smaller diameter cross section of the chamber, the smaller radius of the chamber causes an increase in the velocity of the whirling gas and particulate matter is thrown outward to the sides of the chamber by centrifugal force. These separators have fair efficiency for removing particulate matter from gas streams. The present invention discharges foam somewhat similar to the foam used for fire fighting, into the gas stream or streams that enter the separation chamber. The foam traps particulate matter in the gas stream and as the foam comes against and coats the side wall of the separation chamber, the mixture of foam and particulate matter forms a slurry which drains down the sides of the separation chamber and which accumulates in the bottom of the chamber. From time to time, a bottom of the chamber can be opened to discharge the accumulated slurry so that it will not fill up the interior of the separation chamber and impair the operation of the separator.

Although sprays of water have previously been used in centrifugal separators in an effort to trap particulate matter more effectively, these sprays have proved unsuccessful. However, the use of a strong foam in the gas streams increases the efficiency of a cyclone separator to performances which have never been attainable.

Experience has shown that the amount of foam required is not great and that the cost is extremely low for the amount of extra efficiency obtained from the cyclone separator.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic vertical sectional view through a cyclone separator equipped with the foaming means of this invention; and FIG. 2 is a top plan view of the separator shown in FIG. 1 with the center outlet pipe removed.

DESCRIPTION OF PREFERRED EMBODIMENT

The drawing shows a cyclone separator 10 which has a frusto-conical separation chamber 12 with a wall 14 that extends downward to an opening 16.

Gas, laden with particulate matter, flows into the chamber 12 from a passage 20 at the upper end of the chamber. This passage 20 is positioned to discharge its gas stream tangentially around the circumference of the upper part of the wall 14.

The passage 20 discharges into the separation chamber, which has a cover 15, and flows downwardly with a swirling movement and increasing velocity as the cross section of the separation chamber decreases. Particulate matter in the gas is thrown outward by centrifugal force and the gas, separated from most of its particulate matter, reverses its flow at the center region of the separation chamber and flows upward to an outlet discharge 24 which extends upward through the top of the chamber and in substantial alignment with the axis of the chamber 12. The construction and operation of the cyclone separator, thus far described, is in accordance with conventional practice.

This invention introduces foam into the particulate-laden gas stream. In the illustrated embodiment, the foam is injected into the gas stream by a nozzle 26 which extends into the gas inlet passage 20 upstream from the outlet of this passage where the gas flows into the separation chamber 12. The foam traps the particulate matter and forms with the particulate matter a slurry.

The coating of slurry, indicated by the reference character 28, on the wall of the separation chamber is indicated in elevation by stippling in the drawing and is shown in section where the wall 14 is shown in section. The slurry 28 runs down the wall and accumulates in the lower part of the separation chamber 12 at the opening 14 which is normally closed by a bottom 30.

In the construction illustrated, the bottom 30 is supported from the wall 14 by a bracket 32 to which the bottom is connected by a hinge comprising a pin 34 which extends through one side of the bottom 30 and through aligned openings in the bracket 32. A spring 36 is connected at one end to the bracket 32, and the other end of the spring 36 contacts with the bottom 30 to hold the bottom in a position to close the opening 16, as indicated in full lines in FIG. 1. When sufficient weight of slurry accumulates in the lower end of the separation chamber 12, the weight of the slurry overcomes the force of the spring and causes the bottom 30 to swing into an open position as indicated in dotted lines in FIG. 1. The accumulated slurry drops out of the chamber, and the spring 36 pushes the bottom 30 back into closed position.

A foam generator 40 supplies the nozzle 26. Foam generators are well-known and the block diagrams of FIGS. 1 and 2 are sufficient for a complete understanding of this invention. Water, air and foaming agent are supplied to the foamer 40 from a mixer 42; and the water, air and foaming agent are supplied to the mixer 42 through pipes 44, 45 and 46, respectively.

Each of the pipes 44, 45 and 46 is shown with a valve 48 for regulating the supply of water, air or foaming agent, and the proportions in which these ingredients are supplied to the mixer 42. These valves 48 are merely representative of means for controlling the supply of the ingredients to the mixer 42 and for proportioning the ingredients.

More elaborate controls for the ingredients supplied to the mixers 42 can be used, such as fluid flow regulators that receive fluid at variable pressure and deliver it at a uniform pressure and/or flow. These controls are adjustable to regulate the proportions supplied to a mixer. Such controls are also well-known and the particular apparatus used for controlling the flow and proportions of the ingredients is a matter of choice.

It is necessary, however, to use the right kind of foam. Water sprays have been used with cyclone separators without substantially increasing the efficiency of the separator. Likewise, a weak watery foam is ineffective for the purposes of this invention.

For purposes of this invention, the foam preferably has small bubbles, of the order of 0.030 inch and preferably approximately 0.007 inch. The foaming agent is preferably from 1 to 3 percent of the combined water and foaming agent mixture. The expansion factor is preferably from 30 to 60 (the ratio of air to water in the foam).

The preferred foaming agent is a synthetic protein material liquid similar to the high expansion foam agents used for fire fighting. Such foam can be obtained from DeTer Company, Inc., at 3699 Rt. 46, Parsippany, N.J. 07054.

Experience has shown that it is not essential to supply foam continuously to the separator. It is sufficient that the wall of the separation chamber be at least partially coated with foam at all times. In order to conserve foam, a control valve 50 is located between the mixer and the foamer for shutting off the mixture at times when no foam is required.

In order to program the supply of foam with the operation of the cyclone separator a cycle timer 52 controls a power supply to a solenoid or other actuator 54 for the valve 50. The cycle timer 52 opens and closes the valve 50 periodically and for such length of time as necessary to maintain the required amount of time in the separation chamber.

In accordance with conventional practice, the gas and particulate matter is supplied to the separator by a centrifugal blower 56 or other apparatus for moving the air and solids.

This invention is applicable to other types of centrifugal separators where particulate matter is separated from a gas by this centrifugal force. The term "cyclone separator" is used herein to designate any such type of centrifugal separator.

The preferred embodiment of the invention has been illustrated and described, but changes and modifications can be made, and some features can be used in different combinations without departing from the invention as defined in the claims.

What is claimed is:

1. A cyclone separator including in combination a chamber, a gas outlet at the upper end thereof and in generally axial alignment with the longitudinal axis of the chamber, but of substantially less cross section than that of the upper end of the chamber, an inlet passage through which particulate-laden gas enters the chamber, said inlet passage being located at the upper part of the chamber and directed generally tangential of the cyclonic separation chamber with a downward component, a nozzle means in position to direct a stream of foam into the gas stream of said inlet passage in a position for the foam to travel with the gas flow down the sides of the separation chamber to coat said sides and retain particulate matter collected from the gas stream, and an outlet at which a slurry of particulate matter and foam collects at the bottom of the chamber and from which the slurry is discharged.

2. The centrifugal separator described in claim 1 characterized by shut-off means to control the supply of foam to the separator, an actuator that opens and closes the shut-off means to supply and shut off the foam, and a cyclic timer adjustable to periodically operate the actuator for the shut-off means.

3. The cyclone separator described in claim 1 characterized by the nozzle means being in position to discharge foam into the gas stream before the gas stream is discharged into the separation chamber.

4. The cyclone separator described in claim 1 characterized by a bottom closing the lower end of the chamber and one which the slurry accumulates, and means for moving the bottom into open position to dump the slurry.

5. The cyclone separator described in claim 4 characterized by hinge means by which the bottom is supported and on which the bottom swings into open position when the weight of the accumulated slurry reaches a predetermined value, and means for restoring the bottom to its closed position after each dumping operation.

6. The cyclone separator described in claim 1 characterized by foam making equipment that mixes foaming agent and water upstream of and connected to the nozzle means including means for proportioning the agent and water.

7. The cyclone separator described in claim 6 characterized by the proportioning means limiting the water supply to produce a strong foam.

8. The cyclone separator described in claim 7 characterized by the proportioning means being adjustable, and correlated to supply foam having from one to three parts of foaming agent to 100 parts of water, by volume.

9. The cyclone separator described in claim 7 characterized by a foaming agent supply means for high expansion foaming agent, and the proportioning means producing an expansion ratio of about 30 to 60.

10. The method of separating particulate matter from a gas stream which comprises directing a stream of gas, that contains particulate matter, into a separation chamber of a cyclone separator, discharging foam into the chamber to mix with the gas stream and moves along the sides of the chamber, trapping particulate matter from the gas stream in the foam to form a slurry, draining the slurry down the side wall of the separation chamber, and discharging the slurry from the lower part of the chamber.

11. The method described in claim 10 characterized by accumulating the slurry across a bottom of the chamber, and dumping the slurry when the accumulation exceeds a predetermined limit.

12. The method described in claim 10 characterized by forming the foam from a synthetic protein material liquid foaming agent mixed with water in one to three parts foaming agent to about one hundred parts of water, by volume, and with an expansion factor of 30 to 60 to obtain a foam strong enough to trap and hold the particulate matter in the slurry while it drains out of the chamber of the separator.

* * * * *